(12) United States Patent
Sumi et al.

(10) Patent No.: US 12,069,232 B2
(45) Date of Patent: Aug. 20, 2024

(54) DISPLAY DEVICE

(71) Applicant: InnoLux Corporation, Miao-Li County (TW)

(72) Inventors: Naoki Sumi, Miao-Li County (TW); Hao-Yu Liou, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/237,399

(22) Filed: Aug. 23, 2023

(65) Prior Publication Data

US 2023/0396757 A1    Dec. 7, 2023

Related U.S. Application Data

(63) Continuation of application No. 17/183,260, filed on Feb. 23, 2021, now abandoned.

(51) Int. Cl.
*H04N 13/383* (2018.01)
*H04N 13/117* (2018.01)
*H04N 13/322* (2018.01)

(52) U.S. Cl.
CPC ......... *H04N 13/383* (2018.05); *H04N 13/322* (2018.05); *H04N 13/117* (2018.05)

(58) Field of Classification Search
USPC .......................................... 348/51
See application file for complete search history.

(56) References Cited

U.S. PATENT DOCUMENTS

| 2012/0262549 | A1* | 10/2012 | Ferguson | H04N 13/327 348/46 |
| 2013/0202191 | A1* | 8/2013 | Wang | H04N 13/111 382/154 |
| 2014/0063213 | A1* | 3/2014 | Tsuchihashi | H04N 13/376 348/59 |

* cited by examiner

*Primary Examiner* — Mikhail Itskovich
(74) *Attorney, Agent, or Firm* — Winston Hsu

(57) ABSTRACT

A display device includes a view generator, for generating input view numbers according to reference parameters; a view curve modifier, for generating output view numbers according to the input view numbers and at least one S curve; a three dimensional (3D) image data sampling module, for adjusting image data of pixels according to the output view numbers; and a display module, for displaying at least one image according to the pixels and the image data; wherein viewing positions are modified by the view curve modifier to generate modified viewing positions, the viewing positions correspond to first views, the modified viewing positions correspond to second views, and a number of second views is smaller than a number of first views.

16 Claims, 10 Drawing Sheets

DISPLAY DEVICE

CROSS REFERENCE TO RELATED APPLICATIONS

This application is a continuation application of U.S. application Ser. No. 17/183,260, filed on Feb. 23, 2021. The content of the application is incorporated herein by reference.

BACKGROUND OF THE DISCLOSURE

1. Field of the Disclosure

The present disclosure is related to a display device, and more particularly, to a display device of improving a quality of three dimensional (3D) images.

2. Description of the Prior Art

Display devices with three dimensional (3D) display technologies have been developed, to provide a 3D visual effect to a viewer. For example, the display devices display images of appropriate viewing angles of an object to a right eye and a left eye of the viewer, and the viewer may be able to sense the 3D visual effect.

In the prior art, the display devices with a 2-view 3D display technology or a multi-view 3D display technology provide images of predetermined viewing angles of the object to the viewer. However, the display devices may provide blurred images due to a phenomenon of crosstalk between views of the object. Thus, a display device of improving a quality of 3D images is needed.

SUMMARY OF THE DISCLOSURE

The present disclosure therefore provides a device and a method for solving the abovementioned problem.

A display device comprises a view generator, a view curve modifier, a 3D image data sampling module, and a display module. The view generator is arranged to generate a plurality of input view numbers according to a plurality of reference parameters, wherein the plurality of reference parameters comprise a plurality of positions of a viewer's eyes. The view curve modifier is coupled to the view generator, and is arranged to generate a plurality of output view numbers according to the plurality of input view numbers and at least one S curve. The 3D image data sampling module is coupled to the view curve modifier, and is arranged to calculate a plurality of ray vectors from a plurality of viewing positions to a plurality of pixels and generate a plurality of values of a gray level corresponding to the plurality of pixels along the plurality of ray vectors according to the plurality of output view numbers, to adjust image data of the plurality of pixels. The display module is coupled to the 3D image data sampling module, and is arranged to display at least one image according to the plurality of pixels and the image data. In addition, the at least one S curve comprises a plurality of line segments, and at least one slope of at least one line segment of the plurality of line segments is smaller than or equal to one. The plurality of viewing positions are modified by the view curve modifier to generate a plurality of modified viewing positions, the plurality of viewing positions correspond to a plurality of first views, the plurality of modified viewing positions correspond to a plurality of second views, and a number of the plurality of second views is smaller than a number of the plurality of first views.

A method for improving a quality of 3D images comprises: generating a plurality of input view numbers according to a plurality of reference parameters, wherein the plurality of reference parameters comprise a plurality of positions of a viewer's eyes; generating a plurality of output view numbers according to the plurality of input view numbers and at least one S curve; calculating a plurality of ray vectors from a plurality of viewing positions to a plurality of pixels and generating a plurality of values of a gray level corresponding to the plurality of pixels along the plurality of ray vectors according to the plurality of output view numbers, to adjust image data of the plurality of pixels; and displaying at least one image according to the plurality of pixels and the image data; wherein the at least one S curve comprises a plurality of line segments, and at least one slope of at least one line segment of the plurality of line segments is smaller than or equal to one; wherein the method further comprises: modifying the plurality of viewing positions to generate a plurality of modified viewing positions, wherein the plurality of viewing positions correspond to a plurality of first views, the plurality of modified viewing positions correspond to a plurality of second views, and a number of the plurality of second views is smaller than a number of the plurality of first views.

These and other objectives of the present disclosure will no doubt become obvious to those of ordinary skill in the art after reading the following detailed description of the embodiment that is illustrated in the various figures and drawings.

DETAILED DESCRIPTION

Certain terms are used throughout the following description and claims, which refer to particular components. As those skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to herein".

Figure 1:
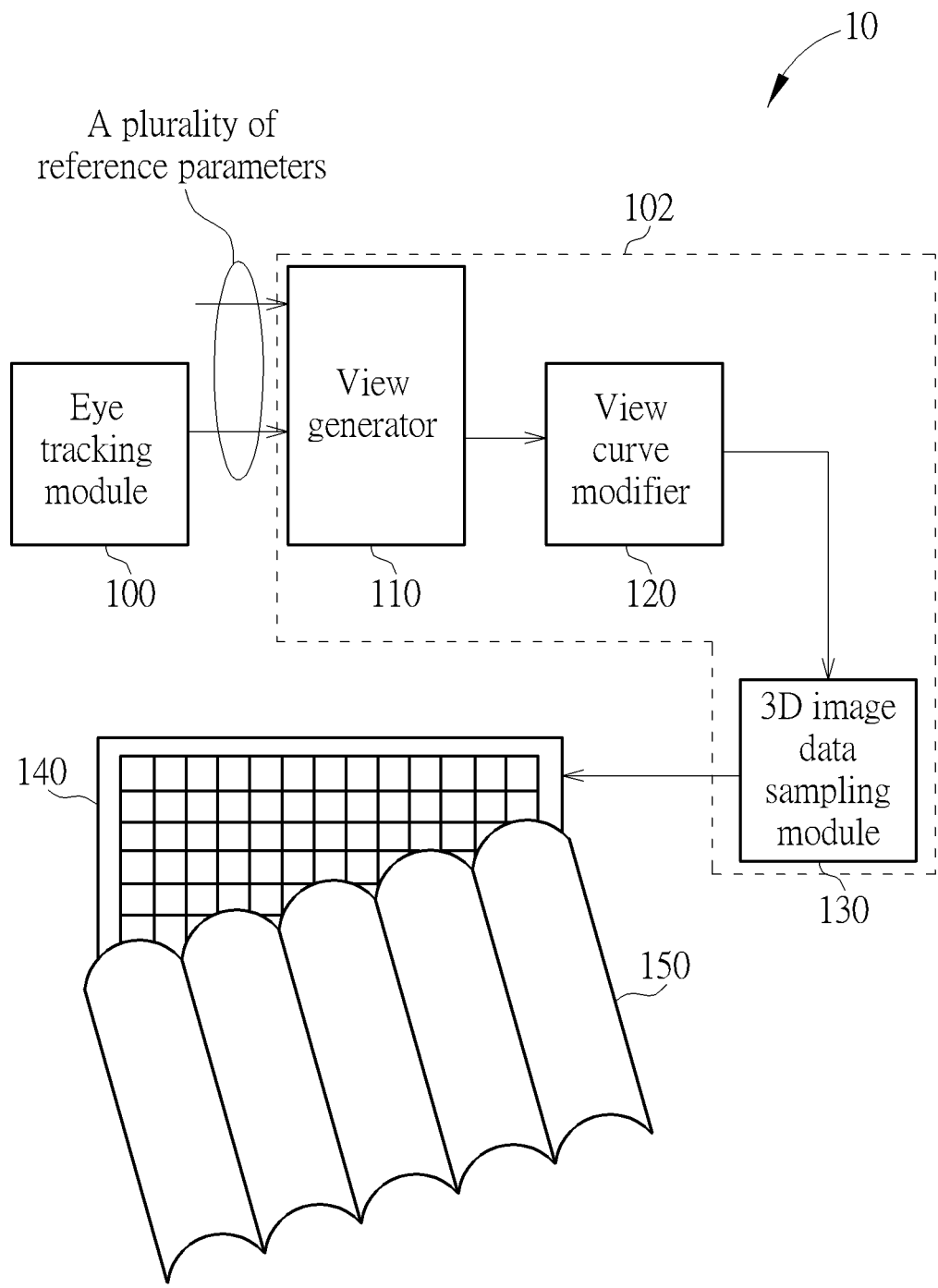
FIG. 1 is a schematic diagram of a display device according to an example of the present disclosure.

FIG. 1 is a schematic diagram of a display device 10 according to an example of the present disclosure. The display device 10 includes an eye tracking module 100, a controller 102, a display module 140 and an optical modulator 150. In detail, the controller 102 allocates image data to a plurality of pixels of the display module 140, and includes an eye tracking module 100, a view generator 110, a view curve modifier 120, a three dimensional (3D) image data sampling module 130. The view generator 110 receives a plurality of reference parameters, and generates a plurality of input view numbers according to the plurality of reference parameters. The view curve modifier 120 is coupled to the view generator 110, and receives the plurality of input view numbers. The view curve modifier 120 generates a plurality of output view numbers according to the plurality of input view numbers and at least one S curve. The 3D image data sampling module 130 is coupled to the view curve modifier 120, and receives the plurality of output view numbers. The 3D image data sampling module 130 adjusts image data of the plurality of pixels of the display module 140 according to the plurality of output view numbers. The display module 140 is coupled to the 3D image data sampling module 130, and displays at least one image according to the plurality of pixels and the image data. That is, the at least one S curve describes a relation between the plurality of input view numbers and the plurality of output view numbers, to modify views corresponding to viewing positions for a viewer. Thus, the image blurring can be reduced. The quality of the 3D images can be improved.

In one example, the plurality of reference parameters may include a plurality of positions of the plurality of pixels of the display module 140. In one example, the plurality of reference parameters may include a plurality of positions of a viewer's eyes. Further, the eye tracking module 100 is coupled to the view generator 110, and tracks the plurality of positions of the viewer's eyes, to estimate positions of the viewer's right eye and left eye. In one example, the plurality of reference parameters may include at least one optical parameter of the optical modulator 150. The optical modulator 150 is coupled to the display module 140, and modulates a plurality of lighting directions of the plurality of pixels of the display module 140. For example, the at least one optical parameter may include pitch of the optical modulator 150, an angle of the optical modulator 150 or an alignment offset of the optical modulator 150. That is, the view generator 110 may generate an input view number according to a position of a pixel, the at least one optical parameter of the optical modulator 150 and the plurality of positions of the viewer's eyes.

In one example, the at least one S curve includes a plurality of line segments, and at least one slope of at least one line segment of the plurality of line segments is smaller than or equal to one. For example, the slope of the at least one line segment of the plurality of line segments may be from 0.2 to 0.4, but is not limited herein. In one example, the at least one S curve includes a plurality of line segments, and at least two line segments of the plurality of line segments have a same slope. In one example, the at least one S curve includes a plurality of line segments, and a slope of at least one line segment of the plurality of line segments is equal to zero. In one example, one or more pairs of the plurality of line segments may be connected directly or indirectly. In one example, one or more pairs of the plurality of line segments may be connected horizontally with vertical distances.

In one example, the at least one S curve includes a plurality of planes, and at least two planes of the plurality of planes have a same normal vector. In one example, the at least one S curve includes a plurality of planes, and at least two planes of the plurality of planes have different normal vectors. In one example, one or more pairs of the plurality of planes may be connected directly or indirectly.

In one example, the view curve modifier 120 generates the plurality of output view numbers according to the plurality of input view numbers and the at least one S curve and a look-up table. The look-up table provides the relation between the plurality of input view numbers and the plurality of output view numbers. That is, the view curve modifier 120 may include the look-up table. In one example, the view curve modifier 120 generates the plurality of output view numbers according to the plurality of input view numbers and the at least one S curve and a function. The function provides the relation between the plurality of input view numbers and the plurality of output view numbers. That is, the view curve modifier 120 may be a calculation module including the function. In one example, the view curve modifier generates the plurality of output view numbers according to the plurality of input view numbers and the at least one S curve and a plurality of smoothing factors.

In one example, the 3D image data sampling module 130 may further receive 3D data corresponding to the plurality of pixels (e.g., from a 3D data storage element or a transmitter), wherein the 3D data may include at least one of geometry data, color data (e.g., color information), lighting data (e.g., light source information) or material data (e.g., surface scattering property), but is not limited herein. In one example, the 3D image data sampling module 130 defines an eye-to-eye line, and converts the plurality of output view numbers to viewing positions on the eye-to-eye line. The 3D image data sampling module 130 calculates ray vectors from the viewing positions to the plurality of pixels. Then, the 3D image data sampling module 130 generates values of a gray level (e.g., in a range 0 to 255) corresponding to the plurality of pixels by 3D data sampling along the ray vectors according to the 3D data and a ray tracing 3D computer graphic (3DCG) manner. That is, the 3D image data sampling module 130 may generate the value of the gray level according to the 3D data and the plurality of output view numbers, to adjust the image data of the plurality of pixels.

In one example, the display module 140 may be at least one of a liquid crystal display (LCD) module or an organic light emitting diode (OLED) display module, a quantum light emitting diode (QLED) display module, a mini light emitting diode (mini-LED) display module, a micro light emitting diode (micro-LED) display module, but is not limited herein. In one example, the optical modulator 150 may be at least one of a lenticular lens film, a liquid crystal (LC) gradient index (GRIN) lens, a parallax barrier, a liquid crystal (LC) parallax barrier or a micro lens array (MLA), but is not limited herein.

It should be noted that, the view curve modifier 120 is drawn to be coupled with the view generator 110 in FIG. 1, to illustrate the modified operations of the present disclosure. In some examples of the present disclosure, the view curve modifier 120 may be a part of the view generator 110, or may be an independent module for modifying the view numbers. When the view curve modifier 120 is a part of the view generator 110, the view generator 110 generates the same view numbers with the view curve modifier 120, i.e., the view generator 110 may directly generate the plurality of output view numbers.

In one example, all pixels of the display module 140 may be divided to a plurality of pattern blocks, and one pattern block of the plurality of pattern blocks includes the plurality of pixels. That is, different pattern blocks are corresponding to different groups of input view numbers. For example, the plurality of input view numbers may be allocated to sub-pixels in a pattern block independently, to show ray vectors directed from viewing positions on an eye to eye line to target pixels of the plurality of pixels.

Figure 2:
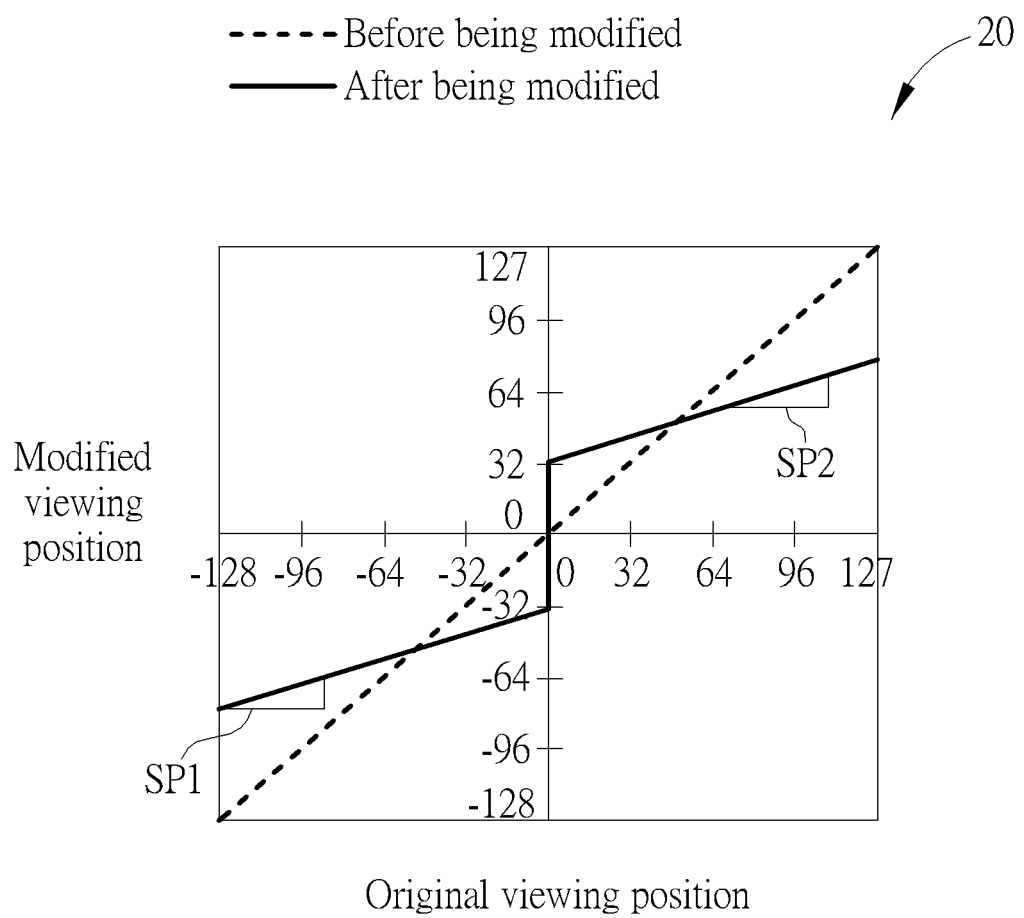
FIG. 2 is a relation diagram between original viewing positions and modified viewing positions according to an example of the present disclosure.

FIG. 2 is a relation diagram 20 between original viewing positions and modified viewing positions according to an example of the present disclosure. The relation diagram 20 may be utilized for realizing a relation between the plurality of input view numbers and the plurality of output view numbers in FIG. 1. In FIG. 2, ranges of the original viewing positions and the modified viewing positions are from −128 to 127 for an 8-bit case. However, the present disclosure is not limited to the 8-bit case. The original viewing position with a value "0" is represented as a center position of a viewer's eyes. The original viewing positions with values from "−128" to "−1" are represented as viewing positions for a right eye of the viewer. The original viewing positions with values from "1" to "127" are represented as viewing positions for a left eye of the viewer. The original viewing position is rearranged to the modified viewing position (e.g., by the view curve modifier 120), and the modified viewing position and the original viewing position may be the same or different.

After being modified, the modified viewing positions have fewer views than the original viewing positions. After that, images of the fewer views are displayed, and the viewer's eyes see the images of the fewer views at the same time. Thus, the influence of the image blurring can be reduced, and the quality of the 3D images can be improved. In addition, the display device of the present disclosure may give the viewer depth cue of eye accommodation, to avoid a vergence accommodation conflict (VAC) issue.

According to FIG. 2, a relation between the original viewing positions and the modified viewing positions has an S curve. The S curve includes line segments, and the line segments have a slope SP1 for the right eye and a slope SP2 for the left eye. The slope SP1 and the slope SP2 are smaller than one, and may be the same.

Figure 3:
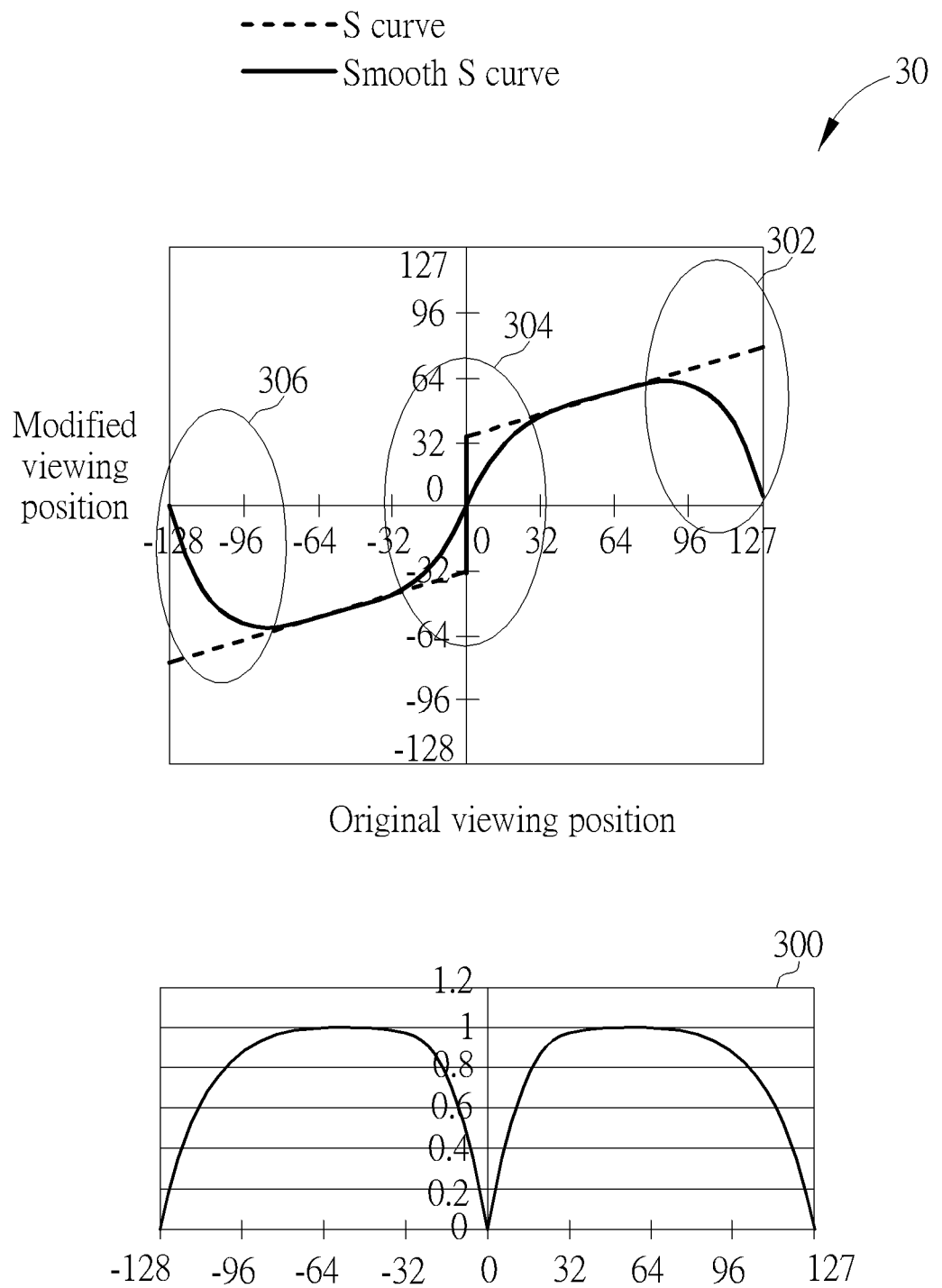
FIG. 3 is a relation diagram between original viewing positions and modified viewing positions according to an example of the present disclosure.

FIG. 3 is a relation diagram 30 between original viewing positions and modified viewing positions according to an example of the present disclosure. The relation diagram 30 may be utilized for realizing a relation between the plurality of input view numbers and the plurality of output view numbers in FIG. 1.

According to FIG. 3, an S curve is modified by a plurality of smoothing factors 300 in a dotted area 302, a dotted area 304 and a dotted area 306. That is, the plurality of smoothing factors 300 are for smoothing the S curve, to generate a smooth S curve. Thus, the viewer may not see discontinuous views or double image(s), when the viewer's head moves. The 3D visual effect of the images is improved.

In one example, the plurality of smoothing factors 300 may be represented by formulas. That is, the S curve may be filtered by the formulas, to generate the smooth S curve.

Figure 4:
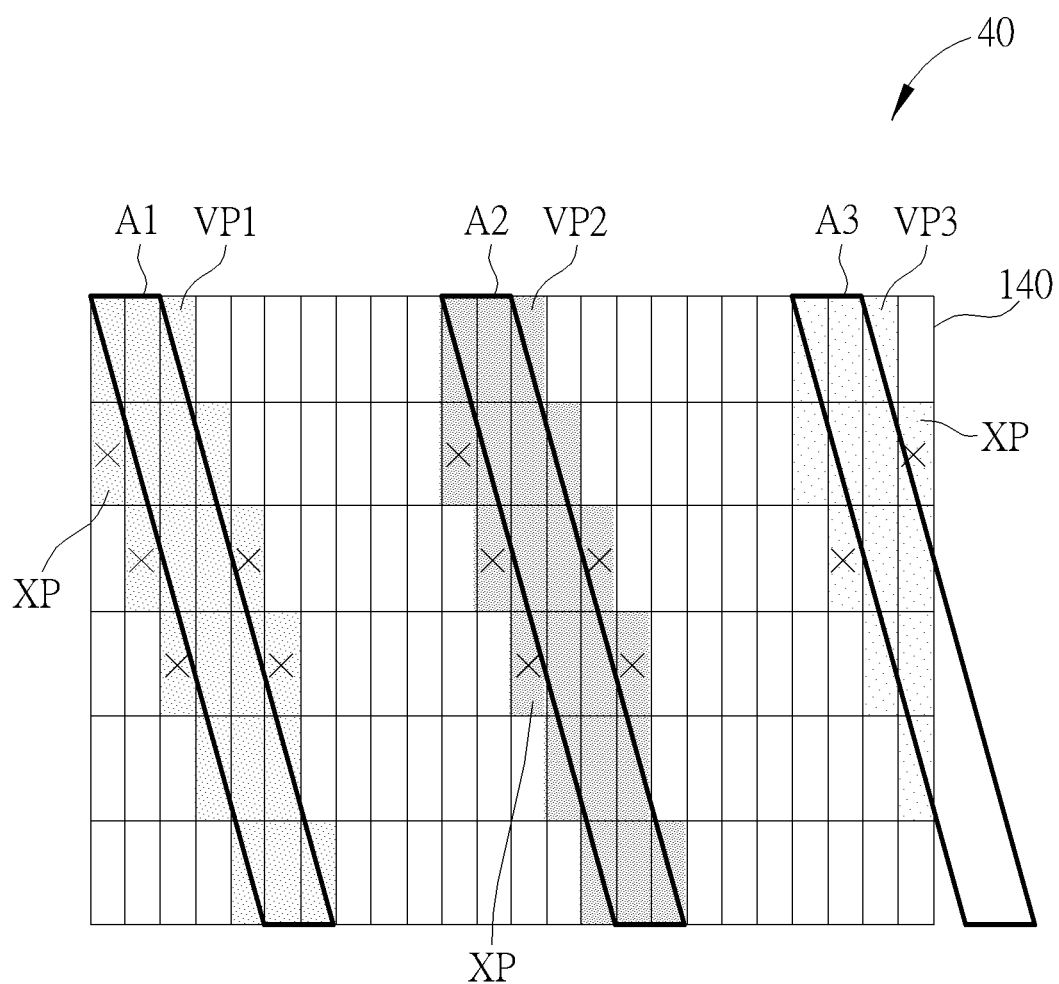
FIG. 4 is a viewing pattern of the display module and the optical modulator according to an example of the present disclosure.

FIG. 4 is a viewing pattern 40 of the display module 140 and the optical modulator 150 according to an example of the present disclosure. In FIG. 4, pixels of the display module 140 are for displaying images to a viewer. For example, viewing pixels VP's display images via a lens focusing area A1 of the optical modulator 150. Viewing pixels VP2s display images via a lens focusing area A2 of the optical modulator 150. Viewing pixels VP3s display images via a lens focusing area A3 of the optical modulator 150. It should be noted that, X mark pixels XPs in the viewing pixels have an impact on the images blurring because the X mark pixels XPs may provide undesirable extra views to the viewer. The view curve modifier 120 can rearrange the X mark pixels XPs to the viewing pixels VP1s, viewing pixels VP2s or viewing pixels VP3s. Therefore the rearranged X mark pixels show the desirable image, and the phenomenon of crosstalk and/or the image blurring can be reduced.

Figure 5:
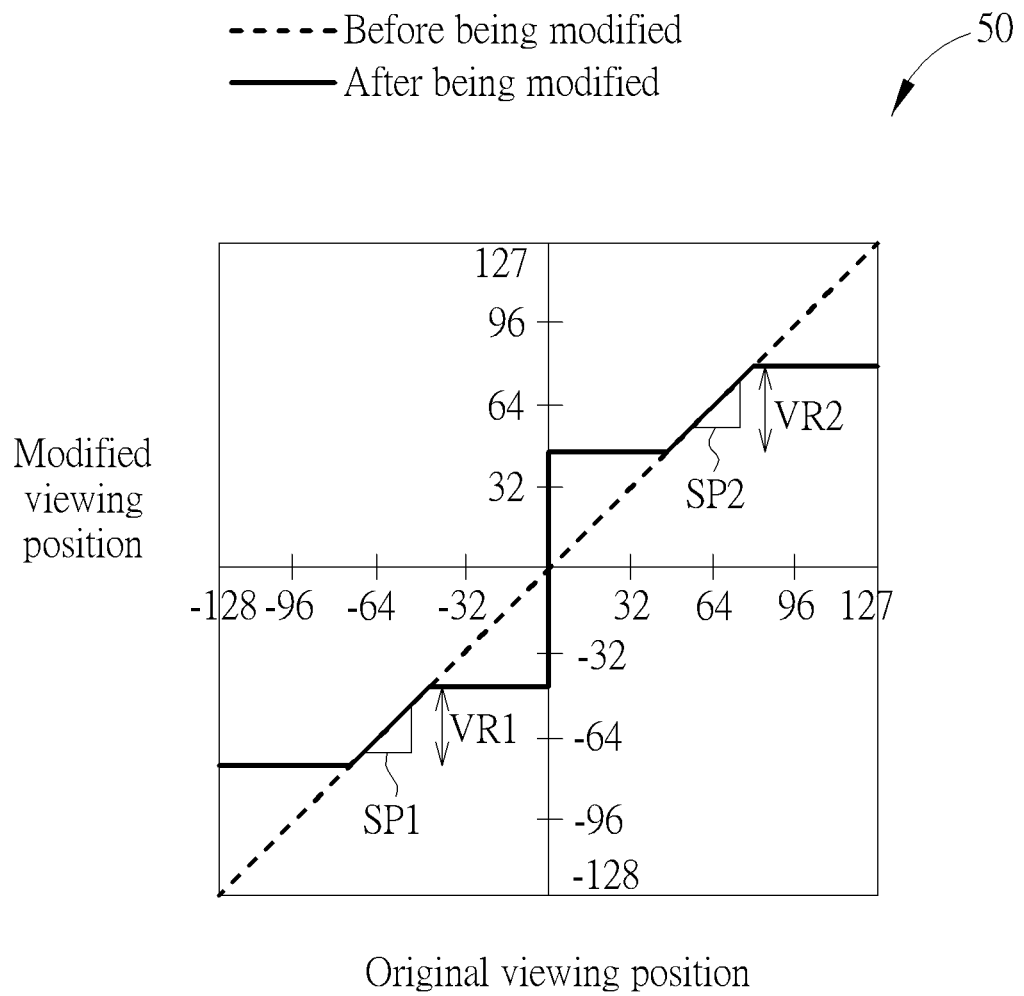
FIG. 5 is a relation diagram between original viewing positions and modified viewing positions according to an example of the present disclosure.

FIG. 5 is a relation diagram 50 between original viewing positions and modified viewing positions according to an example of the present disclosure. The relation diagram 50 may be utilized for realizing a relation between the plurality of input view numbers and the plurality of output view numbers in FIG. 1. The original viewing position is rearranged to the modified viewing position (e.g., by the view curve modifier 120). The modified viewing position and the original viewing position are the same, when the modified viewing position is in a viewing range VR1 of the viewer's right eye or a viewing range VR2 of the viewer's left eye. Otherwise, the modified viewing position is as same as the closest modified viewing position in the viewing range VR1 or the viewing range VR2.

After being modified, the modified viewing positions in the viewing range VR1 and the view range VR2 have views the same as those of the original viewing positions. When not being in the viewing range VR1 and the view range VR2, the adjacent modified viewing positions have the same view. Thus, the phenomenon of crosstalk and/or the image blurring can be reduced by eliminating extra view information. The quality of the 3D images can be improved.

According to FIG. 5, a relation between the original viewing positions and the modified viewing positions has a double S curve. The double S curve includes line segments, and the line segments have a slope SP1 and a slope SP2. The slope SP1 and the slope SP2 are equal to one. In one example, the line segments have a slope, and the slope is equal to zero.

Figure 6:
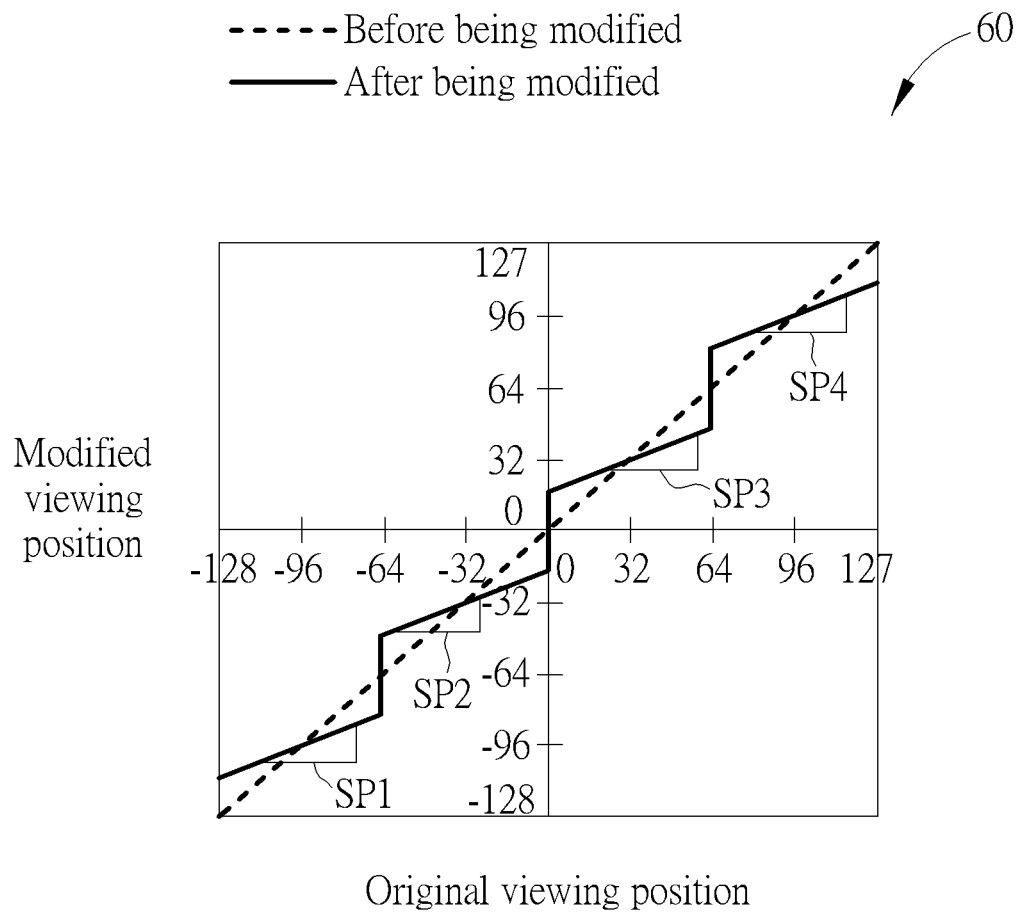
FIG. 6 is a relation diagram between original viewing positions and modified viewing positions according to an example of the present disclosure.

FIG. 6 is a relation diagram 60 between original viewing positions and modified viewing positions according to an example of the present disclosure. The relation diagram 60 may be utilized for realizing a relation between the plurality of input view numbers and the plurality of output view numbers in FIG. 1. The original viewing position is rearranged to the modified viewing position (e.g., by the view curve modifier 120). The modified viewing position and the original viewing position may be the same or different.

After being modified, the modified viewing positions have fewer views than the original viewing positions. After that, images of fewer views are displayed, and the viewer's eyes see the images of the fewer views at the same time.

According to FIG. 6, a relation between the original viewing positions and the modified viewing positions has a multi-S curve. The multi-S curve includes line segments, and the line segments have a slope SP1, a slope SP2, a slope SP3 and a slope SP4. The slope SP1, the slope SP2, the slope SP3 and the slope SP4 are smaller than one, and may be the same. It should be noted that, the present disclosure is not limited that the line segments of the multi-S curve have the four slopes. The line segments of multi-S curve may have less or more slopes, e.g., more than three slopes.

In one example, the display device 10 may provide images for multiple viewers according to the relation diagram 60. For example, the display device 10 may generate 3D visual effect by providing the images of different viewing angles for a first viewer. A second viewer may also sense the 3D visual effect according to the images, if the second viewer is close to the first viewer and shares the same eye-to-eye line as the first viewer.

Figure 7:
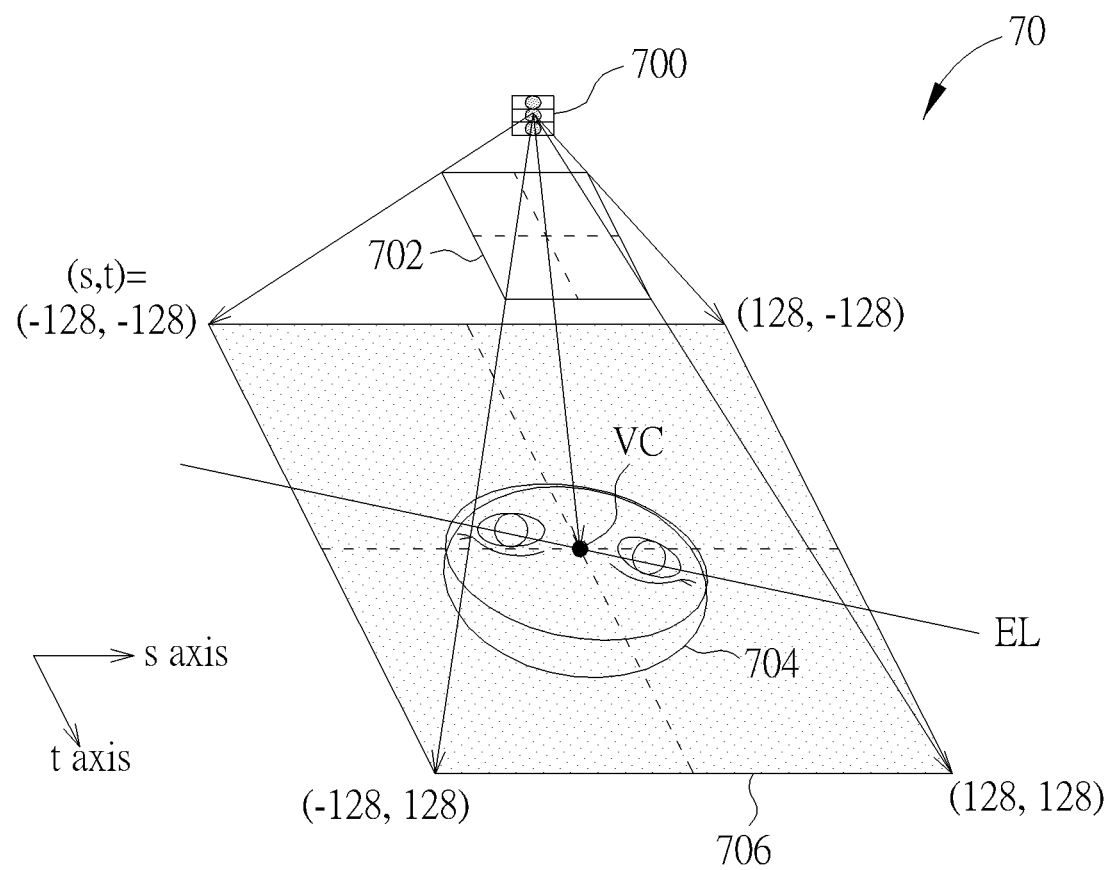
FIG. 7 is a schematic diagram of a viewing scenario according to an example of the present disclosure.

FIG. 7 is a schematic diagram of a viewing scenario 70 according to an example of the present disclosure. In this example, the display module 140 may be a mini LED display module, a micro LEDs display module or a display module with micro lens arrays (MLAs), but is not limited herein. According to FIG. 7, the display module 140 includes a light source 700 and a pixel plane 702 of an s-t axis, and is watched by a viewer 704. The 3D image data sampling module 130 may generate parameters of a center position VC of viewer 704's eyes on an eye-to-eye line EL according to positions of the viewer 704's eyes detected by the eye tracking module 100. The 3D image data sampling module 130 generates parameters of a viewing position plane 706 of the s-t axis corresponding to the pixel plane. That is, the view curve modifier 120 may be a 2D view curve modifier. The view curve modifier 120 receives the plurality of input view numbers (s, t), and generates the plurality of output view numbers (s, t).

In one example, the s-t axis may be equal to an x-y axis. In one example, a relation between the plurality of input view numbers and the plurality of output view numbers has a 2D S curve, and may include 2 planes for the right eye and the left eye of the viewer in the s-t axis, respectively. In one example, the view curve modifier 120 may generate the plurality of output view numbers according to the plurality of input view numbers, the 2D S curve and a 2D look-up table. In other words, the view curve modifier 120 may include a 2D look-up table. In one example, the plane for the right eye and the plane for the left eye may have the same normal vector.

Figure 8:
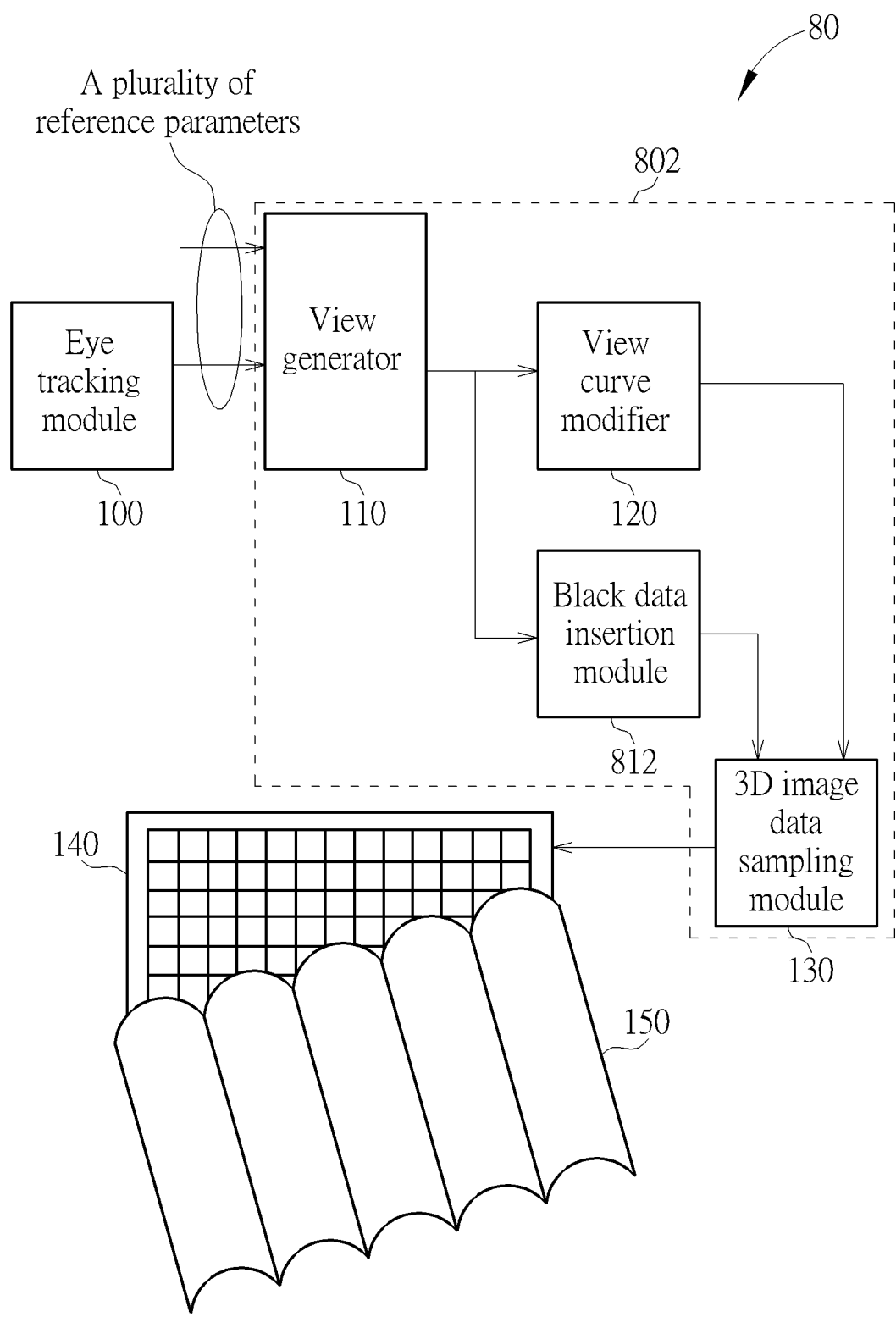
FIG. 8 is a schematic diagram of a display device according to an example of the present disclosure.

FIG. 8 is a schematic diagram of a display device 80 according to an example of the present disclosure. The display device 80 includes the eye tracking module 100, the controller 802, the display module 140 and the optical modulator 150. The controller 802 allocates image data to the plurality of pixels of the display module 140, and includes the view generator 110, the view curve modifier 120, the 3D image data sampling module 130 and a black data insertion module 812. In detail, the black data insertion module 812 is coupled to the view generator 110 and the 3D image data sampling module 130, and receives the plurality of input view numbers from the view generator 110. The black data insertion module 812 generates a plurality of modification factors according to the plurality of input view numbers, and transmits the plurality of modification factors to the 3D image data sampling module 130. The 3D image data sampling module 130 may adjust the image data of the plurality of pixels according to the plurality of output view numbers generated by the view curve modifier 120 and the plurality of modification factors. That is, the display device 80 includes the black data insertion module 812, to modify light intensity in discontinuous view transition areas. Thus, the phenomenon of crosstalk can be reduced. The 3D visual effect of the images can be improved.

Figure 9:
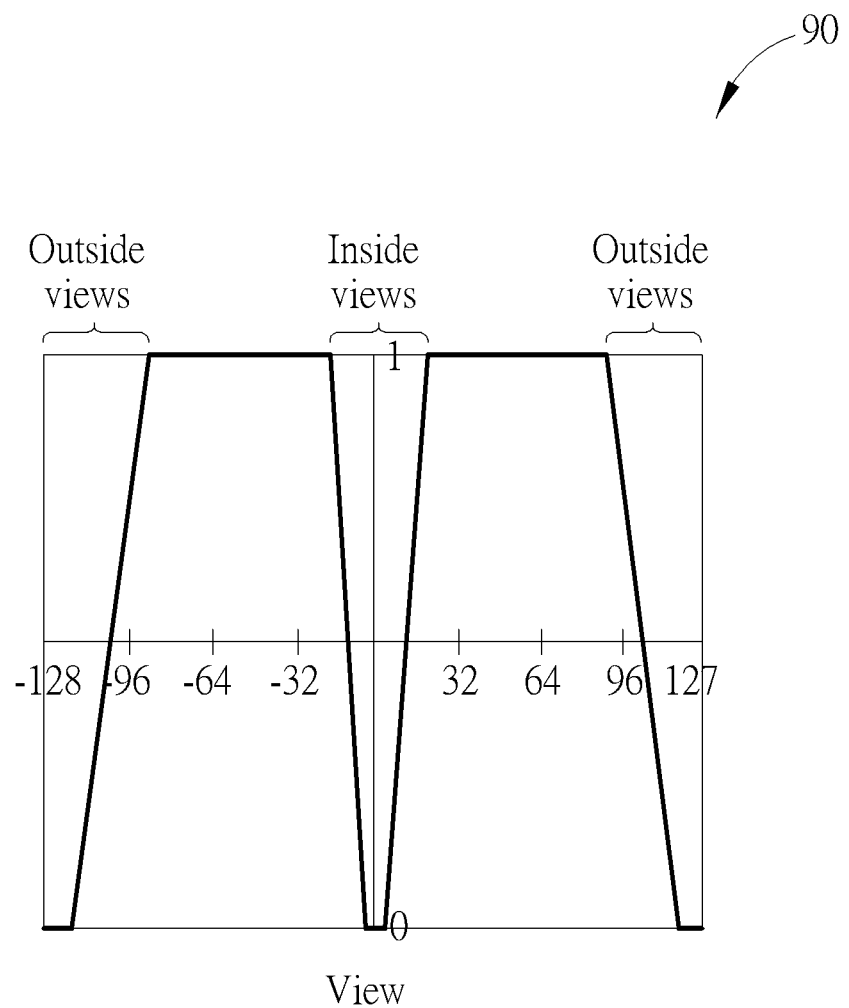
FIG. 9 is a schematic diagram of a plurality of modification factors according to an example of the present disclosure.

FIG. 9 is a schematic diagram of a plurality of modification factors 90 according to an example of the present disclosure. The plurality of modification factors 90 may be utilized for realizing the plurality of modification factors generated by the black data insertion module 812 in FIG. 8. According to FIG. 9, when the views are outside views or inside views (e.g., the views are in discontinuous view transition areas), values of the plurality of modification factors 90 are smaller than one. When the views are not the outside views or the inside views (i.e., the views are in areas close to the right eye positions or the left eye positions), values of the plurality of modification factors 90 are one. That is, the viewer may see darker images in the viewing positions corresponding to the outside views or the inside views.

In one example, the insertion areas (e.g., areas of the outside views and the inside views) may be ten percent of the total views' areas. In one example, the 3D image data sampling module 130 may modify the values of the gray level according to the plurality of modification factors 90, to adjust the image data for the plurality of pixels of the display module 140. Thus, the phenomenon of crosstalk can be reduced, and/or the double image issue may be solved. The quality of the 3D images can be improved.

Figure 10:
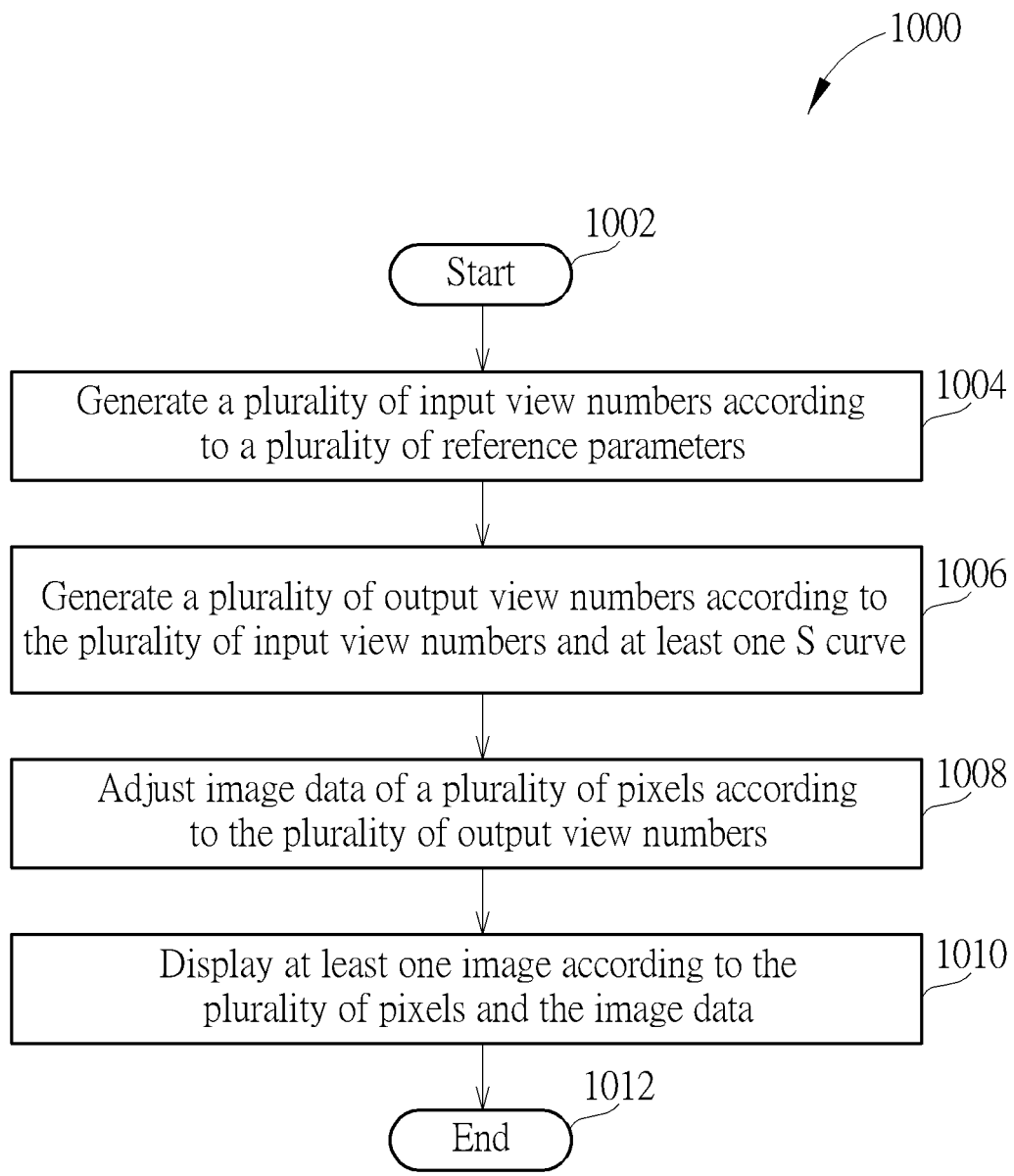
FIG. 10 is a flowchart of a process according to an example of the present disclosure.

FIG. 10 is a flowchart of a process 1000 according to an example of the present disclosure. The process 1000 is utilized in the display device 10, and includes the following steps:

Step 1002: Start.

Step 1004: Generate a plurality of input view numbers according to a plurality of reference parameters.

Step 1006: Generate a plurality of output view numbers according to the plurality of input view numbers and at least one S curve.

Step 1008: Adjust image data of a plurality of pixels according to the plurality of output view numbers.

Step 1010: Display at least one image according to the plurality of pixels and the image data.

Step 1012: End.

Detailed description and variations of the process 1000 can be referred to the previous description, and are not narrated herein. Those skilled in the art should readily make combinations, modifications and/or alterations on the above-mentioned description and examples.

In the above examples, the term "from A to B" is an inclusive description, i.e., A and B are included.

To sum up, the present disclosure provides a display device and a method with 3D display technologies. The display device modifies the views corresponding to the viewing positions. Thus, the image blurring due to the phenomenon of crosstalk can be reduced. In additions, the double image issue and/or the VAC issue can be solved. As a result, the quality of the 3D images can be improved.

Also, to determine whether the present disclosed display device has been infringed, a structure and 3D image performance of a display device at issue would be analyzed by a camera or a special optical measurement system. Angles and positions of the camera would be changed, to take a plurality of photos (e.g., sequential images). The plurality of photos would be analyzed, to obtain how an edge position of an object shifts in viewing angles. According the plurality of photos, whether the display device at issue has infringed the present disclosed display device is determined.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device, comprising:
a view generator, for generating a plurality of input view numbers according to a plurality of reference parameters, wherein the plurality of reference parameters comprise a plurality of positions of a viewer's eyes;
a view curve modifier, coupled to the view generator, for generating a plurality of output view numbers according to the plurality of input view numbers and at least one S curve;
a three dimensional (3D) image data sampling module, coupled to the view curve modifier, for calculating a plurality of ray vectors from a plurality of viewing positions to a plurality of pixels and generating a plurality of values of a gray level corresponding to the plurality of pixels along the plurality of ray vectors according to the plurality of output view numbers, to adjust image data of the plurality of pixels; and
a display module, coupled to the 3D image data sampling module, for displaying at least one image according to the plurality of pixels and the image data;
wherein the at least one S curve comprises a plurality of line segments, and at least one slope of at least one line segment of the plurality of line segments is smaller than or equal to one;
wherein the plurality of viewing positions are modified by the view curve modifier to generate a plurality of modified viewing positions, the plurality of viewing positions correspond to a plurality of first views, the plurality of modified viewing positions correspond to a plurality of second views, and a number of the plurality of second views is smaller than a number of the plurality of first views.

2. The display device of claim 1, further comprising:
an eye tracking module, coupled to the view generator, for tracking the plurality of positions of the viewer's eyes.

3. The display device of claim 1, wherein the plurality of reference parameters comprise at least one optical parameter of an optical modulator, and the display device further comprises:
the optical modulator, coupled to the display module, for modulating a plurality of lighting directions of the plurality of pixels of the display module.

4. The display device of claim 1, wherein at least two line segments of the plurality of line segments have a same slope.

5. The display device of claim 1, wherein the at least one S curve comprises a plurality of planes, and at least two planes of the plurality of planes have a same normal vector.

6. The display device of claim 1, wherein the view curve modifier generates the plurality of output view numbers according to the plurality of input view numbers and the at least one S curve and a look-up table.

7. The display device of claim 1, wherein the view curve modifier generates the plurality of output view numbers according to the plurality of input view numbers and the at least one S curve and a plurality of smoothing factors.

8. The display device of claim 1, wherein the 3D image data sampling module adjusts the image data of the plurality of pixels according to the plurality of output view numbers and a plurality of modification factors, and the display device further comprises:
a black data insertion module, coupled to the view generator and the 3D image data sampling module, for generating the plurality of modification factors.

9. A method for improving a quality of three dimensional (3D) images, comprising:
generating a plurality of input view numbers according to a plurality of reference parameters, wherein the plurality of reference parameters comprise a plurality of positions of a viewer's eyes;
generating a plurality of output view numbers according to the plurality of input view numbers and at least one S curve;
calculating a plurality of ray vectors from a plurality of viewing positions to a plurality of pixels and generating a plurality of values of a gray level corresponding to the plurality of pixels along the plurality of ray vectors according to the plurality of output view numbers, to adjust image data of the plurality of pixels; and
displaying at least one image according to the plurality of pixels and the image data;
wherein the at least one S curve comprises a plurality of line segments, and at least one slope of at least one line segment of the plurality of line segments is smaller than or equal to one;
wherein the method further comprises:
modifying the plurality of viewing positions to generate a plurality of modified viewing positions, wherein the plurality of viewing positions correspond to a plurality of first views, the plurality of modified viewing positions correspond to a plurality of second views, and a number of the plurality of second views is smaller than a number of the plurality of first views.

10. The method of claim 9, further comprising:
tracking the plurality of positions of the viewer's eyes.

11. The method of claim 9, wherein the plurality of reference parameters comprise at least one optical parameter of an optical modulator, and the method further comprises:
modulating a plurality of lighting directions of the plurality of pixels.

12. The method of claim 9, wherein the at least one S curve comprises a plurality of line segments, and at least two line segments of the plurality of line segments have a same slope.

13. The method of claim 9, wherein the at least one S curve comprises a plurality of planes, and at least two planes of the plurality of planes have a same normal vector.

14. The method of claim 9, further comprising:
generating the plurality of output view numbers according to the plurality of input view numbers and the at least one S curve and a look-up table.

15. The method of claim 9, further comprising:
generating the plurality of output view numbers according to the plurality of input view numbers and the at least one S curve and a plurality of smoothing factors.

16. The method of claim 9, wherein the step of adjusting the image data of the plurality of pixels according to the plurality of output view numbers comprises:
generating a plurality of modification factors; and
adjusting the image data of the plurality of pixels according to the plurality of output view numbers and the plurality of modification factors.

* * * * *